(12) United States Patent
Wang

(10) Patent No.: US 9,219,360 B2
(45) Date of Patent: Dec. 22, 2015

(54) SAFE QUICK DISCONNECT LEAKAGE PROTECTOR

(75) Inventor: Zhongyu Wang, Guangdong (CN)

(73) Assignee: SHENZHEN LIANGHUI TECHNOLOGY CO., LTD., Shenzhen (CN)

(*) Notice: Subject to any disclaimer, the term of this patent is extended or adjusted under 35 U.S.C. 154(b) by 12 days.

(21) Appl. No.: 14/235,798

(22) PCT Filed: Aug. 9, 2011

(86) PCT No.: PCT/CN2011/078171
§ 371 (c)(1),
(2), (4) Date: Jan. 29, 2014

(87) PCT Pub. No.: WO2013/020274
PCT Pub. Date: Feb. 14, 2013

(65) Prior Publication Data
US 2014/0177111 A1    Jun. 26, 2014

(51) Int. Cl.
*H02H 3/00* (2006.01)
*H02H 3/16* (2006.01)
*H02H 3/05* (2006.01)
*H02H 3/33* (2006.01)
*H02H 5/10* (2006.01)
*H02H 1/06* (2006.01)

(52) U.S. Cl.
CPC .............. *H02H 3/162* (2013.01); *H02H 3/05* (2013.01); *H02H 3/334* (2013.01); *H02H 1/066* (2013.01); *H02H 3/16* (2013.01); *H02H 5/105* (2013.01)

(58) Field of Classification Search
USPC ..................................................... 361/42–50
See application file for complete search history.

(56) References Cited

U.S. PATENT DOCUMENTS

2007/0195470 A1* 8/2007 Zhang et al. .................... 361/42
2008/0007879 A1* 1/2008 Zaretsky et al. ................ 361/42

FOREIGN PATENT DOCUMENTS

| CN | 101227074 A | 7/2008 |
| CN | 201178218 Y | 1/2009 |
| GB | 2244397 A | 11/1991 |

OTHER PUBLICATIONS

International Search Report of PCT Application No. PCT/CN2011/078171.

* cited by examiner

*Primary Examiner* — Danny Nguyen

(57) ABSTRACT

The present disclosure provides a safe quick disconnect leakage protector, including a power supply circuit, a sampling circuit, a couple of single-pole single-throws, an on and off control circuit, and a testing circuit. The sampling circuit collects the leakage current signal between the live wire and the neutral wire and outputting the leakage current signal; the main control circuit receives the leakage current signal outputted from the sampling circuit, amplifies the leakage current signal, and outputs a grounding failure control signal when the leakage current reaches the predetermined value; the on and off control circuit receives the grounding failure control signal outputted from the main control circuit and controls the single-pole single-throw switches to disconnect the load from the external power supply according to the grounding failure control signal, thereby protecting the load and improves the safety of the leakage protection of an electrical appliance.

10 Claims, 2 Drawing Sheets

SAFE QUICK DISCONNECT LEAKAGE PROTECTOR

BACKGROUND

1. Technical Field

The present disclosure generally relates to electrical appliances, and more particularly, to a safe quick disconnect leakage protector.

2. Description of Related Art

In daily life, short circuits between electrified conductors in an electrical circuit of an electrical product, such as the short circuit between a neutral wire and a live wire, ground, a housing of an electrical equipment, and various kinds of grounded metal tube, etc, or an insulation resistance of the conductor relative to ground being smaller than a preset value, may cause a grounding failure, which may result in an over current and further a fire or an electrical shock. In order to avoid the situation, a leakage protection plug is widely applied to avoid the grounding failure.

The leakage protection plug is arranged between a power supply and a load for determining whether there is a leakage in the electrical product by detecting an electrical potential difference between the live wire and the neutral wire. Once the leakage protection plug determines there is a leakage in the circuit, a tripping occurs immediately to break the connection between the power supply and the load to avoid a fire or an electrical shock caused by the leakage.

At present, there are various types of leakage protection plugs for grounding failure. Most of the leakage protection plugs respectively include a first detecting circuit, a main control circuit, an on and off mechanism control circuit, a power supply circuit, and a second detecting circuit received in a rectangular housing. The working principle of the leakage protection plug is as follows: when a reset button of the on and off mechanism is pressed, if the load is normal, the first detecting circuit, the main control circuit, the on and off mechanism control circuit, the power supply circuit, and the second detecting circuit all enter into working states. At this time, the first circuit does not detect any leakage current, the main control circuit does not electrify the on and off mechanism control circuit, an off switch of the on and off mechanism control circuit is closed all the time, and the load work normally. In the working process, once the sensing circuit detects the electrical potential difference between the wire line and the neutral wire, the sensing circuit outputs a grounding failure signal to the main control circuit. The main control circuit amplifies the grounding failure signal and electrifies the on and off mechanism control circuit to open the off switch of the on and off mechanism control circuit. Thus, the current between the power supply and the load is cut off to avoid a fire or an electrical shock caused by the leakage.

When there is a leakage current in the load, although the present leakage protection plug can break the connection between the power supply and the load, an error rate of the leakage protection plug is still relatively high and some undesired breakings may occur. Meanwhile, the performance of the leakage protection circuit is always unstable and thus causes undesired noises and overheat and even a burnt down of the leakage protection plug.

SUMMARY

The main object of the present disclosure is to provide a safe quick disconnect leakage protector, for improving the safety of the leakage protection of an electrical appliance.

The safe quick disconnect leakage protector provided in the present disclosure includes:

a power supply circuit, configured for providing power to the leakage protector;

a sampling circuit connected between a live wire and a neutral wire of an input terminal of an external power supply, for collecting a leakage current signal between the live wire and the neutral wire and outputting the leakage current signal;

a main control circuit, configured for receiving the leakage current signal outputted from the sampling circuit, amplifying the leakage current signal, and outputting a grounding failure control signal when the leakage current reaches a predetermined value;

a couple of single-pole single-throw switches, one of the single-pole single-throw switch being connected between the input terminal of the external power supply and the sampling circuit on the live wire, and the other one being connected between the input terminal of the external power supply and the sampling circuit on the neutral wire;

an on and off control circuit, configured for receiving the grounding failure control signal outputted from the main control circuit and controlling the single-pole single-throw switches to disconnect the load from the external power supply according to the grounding failure control signal; and a testing circuit connected to the sampling circuit for providing a stimulated failure current signal to the sampling circuit to test whether the leakage protector work normally.

Preferably, the sampling circuit includes a current transformer, a sampling capacitor, a first filter capacitor, and a current-voltage conversion resistor; the live wire and the neutral wire respectively pass through the current transformer or are respectively wrapped around the current transformer; a first end of the current transformer is connected to the testing circuit and a second end of the current transformer is connected to the main control circuit through the sampling capacitor; one end of the first filter capacitor is connected to a wire end of the second end of the current transformer and the other end of the first filter capacitor is grounded; and the current-voltage conversion resistor is connected between two wire ends of the second end of the current transformer in parallel.

Preferably, the sampling circuit further includes a current limiting resistor connected between the first filter capacitor and the main control circuit in series.

Preferably, the main control circuit includes a chip, a feedback circuit, a second filter capacitor, and a driving reverse voltage protection resistor; an input terminal of the chip is connected to the sampling circuit and the power supply circuit; an output terminal of the chip is connected to the on and off control circuit; the feedback circuit is connected between the input terminal and output terminal of the chip; one end of the second filter capacitor is connected to the output terminal of the chip and the other end of the second filter capacitor is grounded; and the driving reverse voltage protection resistor is connected between the output terminal of the chip and the on and off control circuit in series.

Preferably, the on and off control circuit includes a silicon controlled rectifier, a first voltage dependent resistor, and a coil; an anode of the silicon controlled rectifier is connected to the power supply circuit, a cathode of the silicon controlled rectifier is grounded, and a gate of the silicon controlled rectifier is connected to the driving reverse voltage protection resistor of the main control circuit; the first voltage dependent resistor is connected the anode and the cathode of the silicon controlled rectifier in parallel; and one end of the coil is connected to the power supply circuit and the other end of the coil is connected to the live wire.

Preferably, the main control circuit includes a sampling filter capacitor connected between the input terminal of the chip and the sampling circuit.

Preferably, the power supply circuit includes a diode, a third filter capacitor, a voltage regulating resistor, and a bridge rectifier; a cathode of the diode is connected to the output terminal of the chip and an anode of the diode is connected to the anode of the silicon controlled rectifier after being connected to the voltage regulating resistor in series; a positive pole of a direct current output terminal of the bridge rectifier is connected to the anode of the silicon controlled rectifier, a negative pole of the direct current output terminal of the bridge rectifier is grounded, and an alternating current input terminal of the bridge rectifier is connected to the external power supply; and the bridge rectifier converts a received alternating current to a direct current which is provided to the on and off control circuit.

Preferably, the power supply circuit includes two voltage dropping resistors connected together in series; one end of the two serially-connected resistors is connected to the output terminal of the chip and the other end thereof is connected to the anode of the silicon controlled rectifier and the coil.

Preferably, the testing circuit includes a testing resistor and a testing switch; the testing resistor and the testing switch are connected together in series between the neutral wire and the live wire; and the testing resistor is formed by several resistors which have the same resistance and are connected together in parallel.

Preferably, the testing circuit includes a testing resistor, a testing switch, and a second voltage dependent resistor; the testing resistor, the testing switch, and the second voltage dependent resistor are connected together in series, and the serially-connected testing resistor, testing switch, and second voltage dependent resistor is further connected to a first end of the current transformer.

The leakage protector of the present disclosure is powered by the power supply circuit; the sampling circuit collects the leakage current signal between the live wire and the neutral wire and outputting the leakage current signal; the main control circuit receives the leakage current signal outputted from the sampling circuit, amplifies the leakage current signal, and outputs a grounding failure control signal when the leakage current reaches the predetermined value; the on and off control circuit receives the grounding failure control signal outputted from the main control circuit and controls the single-pole single-throw switches to disconnect the load from the external power supply according to the grounding failure control signal, thereby protecting the load and improves the safety of the leakage protection of an electrical appliance; meanwhile, the testing circuit is configured for providing a stimulated failure current signal to test whether the leakage protector works normally, which improves the working effectiveness of the leakage protector; in addition, the single-pole single-throw switches are arranged in the power supply side to ensure that the leakage protector is not electrified after the load is disconnected from the external power supply, which prevents the situation that the circuit of the power supply side is still at work after the load is actually disconnected from the load and avoids the damages of the electrical components and a secondary leakage caused thereby; the current-voltage conversion resistor adapted in the sampling circuit converts the current to the voltage, which enables the sampling signal to be more stable and reliable; the driving reverse voltage protection resistor arranged in the output side of the chip is capable of preventing the reverse voltage from impacting the chip and the silicon controlled rectifier SCR to reduce the fault rates of the chip and the silicon controlled rectifier SCR and to improve the stability of the whole product; both the sampling circuit and the testing circuit are provided with filter capacitors for filtering out undesired waves, which protects the product from undesired waves and thus improves the anti-interference ability of the product and the performance of the product. Furthermore, the function of the product is clear, the structure of the product is compact, and the maintenance of the product is easy and convenient.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
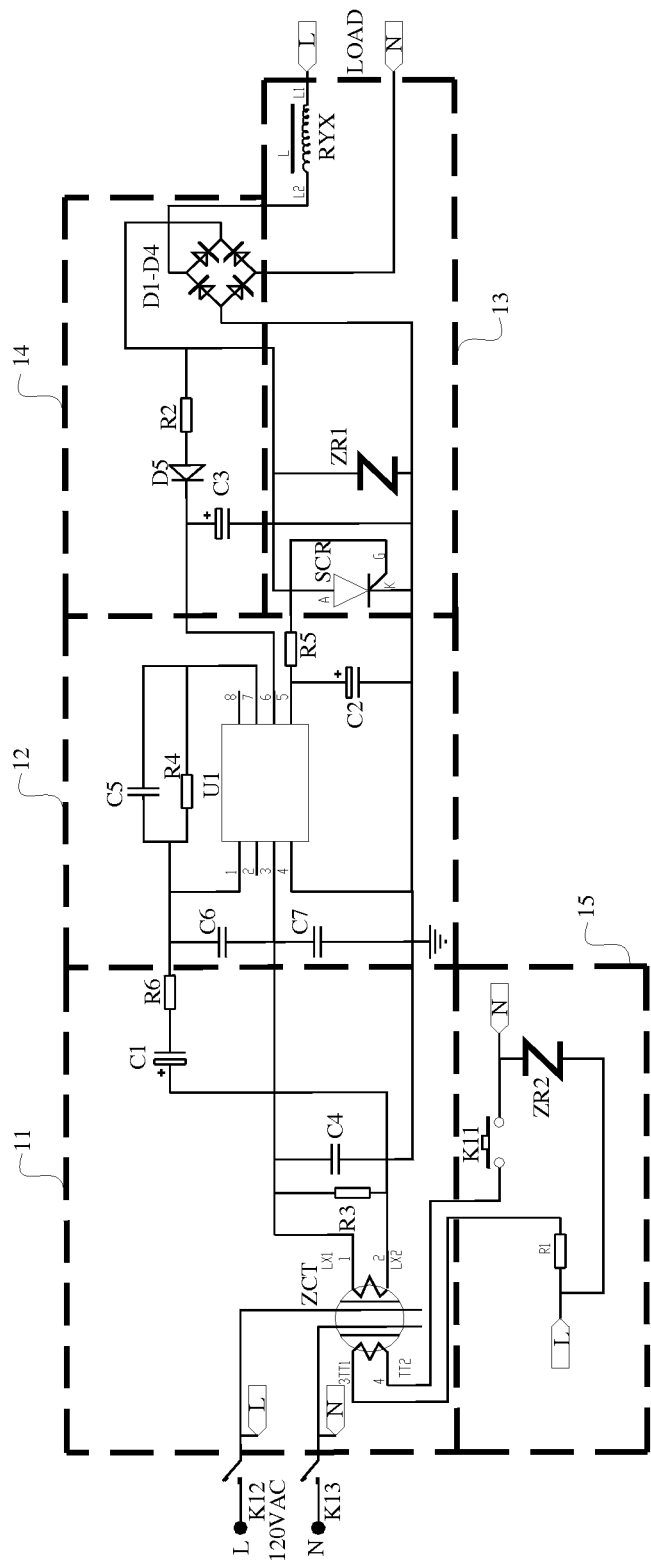
FIG. 1 is a schematic view of a safe quick disconnect leakage protector in accordance with a first embodiment of the present disclosure.

Referring to FIG. 1, which is a schematic view of a safe quick disconnect leakage protector in accordance with a first embodiment of the present disclosure, the leakage protector includes a power supply circuit 14, a sampling circuit 11, a main control circuit 12, a couple of single-pole single-throw switches K12, K13, an on and off control circuit 13, and a testing circuit 15, wherein:

the power supply circuit 14 is configured for supplying power to the leakage protector;

the sampling circuit 11 is connected between a live wire L and a neutral wire N of an external power supply for collecting a leakage current signal between the live wire L and the neutral wire N and outputting the leakage current signal;

the main control circuit 12 is configured for receiving the leakage current signal outputted from the sampling circuit 11, amplifying the leakage current signal, and outputting a grounding failure control signal;

one of the couple of single-pole single-throw switches K12, K13 is connected on the live wire L between an input terminal of the external power supply and the sampling circuit 11, and the other one is connected on the neutral wire N between the input terminal of the external power supply and the sampling circuit 11;

the on and off control circuit 13 is configured for receiving the grounding failure control signal outputted from the main control circuit 12 and controlling the single-pole single-throw switches K12, K13 to disconnect the external power supply from a load; and the testing circuit 15 is connected to the sampling circuit 11 for providing a stimulated failure current signal to the sampling circuit 11 for testing whether the leakage protector works normally or not.

Specifically, in the embodiment, the sampling circuit 11 includes a current transformer ZCT made of ultra-crystalline or permalloy, a sampling capacitor C1, a current limiting resistor R6, a first filter capacitor C4, and a current-voltage conversion resistor R3; the live wire L and the neutral wire N respectively pass through the current transformer ZCT or are respectively wrapped around the current transformer ZCT. The current transformer ZCT includes a first end and a second end formed by a coil winding. The first end of the current transformer ZCT is connected to the testing circuit 15 and the second end thereof is connected to the main control circuit 12 through the sampling capacitor C1 and the current limiting resistor R6. One end of the sampling capacitor C1 is connected to a second wire end LX2 of the second end of the current transformer ZCT and the other end of the sampling capacitor C1 is connected to the main control circuit 12 through the current limiting resistor R6.

One end of the first filter capacitor C4 is connected to a first wire end LX1 of the second end of the current transformer ZCT and the other end thereof is connected to the main control circuit 12. The current-voltage conversion resistor R3 is connected between the two wire ends LX1, LX2 of the second end of the current transformer ZCT in parallel.

The sampling circuit 11 is configured for continuously determining whether a current flowing through the live wire L is equal to a current flowing through the neutral wire N and transmitting the collected leakage current signal to the main control circuit 12 in time.

The live wire L and the neutral wire N pass through the current transformer ZCT or are wrapped around the current transformer ZCT for providing any possible unbalanced leakage current; the current transformer ZCT detects any possible unbalanced leakage current, the current-voltage conversion resistor R3 converts the detected leakage current to a voltage which is further outputted to the main control circuit 12 through the sampling capacitor C1 blocking direct current while allowing alternating current to pass and the current limiting resistor R6.

The sampling capacitor C1 is configuring for being coupled to the leakage current signal obtained by the current transformer ZCT and transmitting the leakage current signal to a chip U1 in the main control circuit 12. The current limiting resistor R6 filters out undesired waves in the leakage current signal outputted from the sampling capacitor C1, which stabilizes the sampled signal.

The main control circuit 12 includes the chip U1, a feedback circuit, a second filter capacitor C2, a driving reverse voltage protection resistor R5, a feedback filter capacitor C, and a sampling filter capacitor formed by two capacitors C6, C7. A output terminal of the chip U1 is connected to the on and off control circuit 13; the feedback circuit is connected between an input terminal and the output terminal of the chip U1; one end of the second filter capacitor C2 is connected to the output terminal of the chip U1 and the other end thereof is grounded; the driving reverse voltage protection resistor R5 is connected between the output terminal of the chip U1 and the on and off control circuit 13 in series.

Specifically, in the embodiment the chip U1 includes five input pins 1, 2, 3, 4, and 6 and three output pins 5, 7, and 8. The first input pin 1 is connected to the current limiting resistor R6 of the sampling circuit 11; the second input pin 2 is emptied; the third input pin 3 is connected to the first wire end LX1 of the second end of the current transformer ZCT; the fourth input pin 4 is grounded; the first output pin 5 is connected to the on and off control circuit 13 through the driving reverse voltage protection resistor R5; the fifth input pin 6 is connected to the power supply circuit 14; a feedback resistor R4 and the feedback filter capacitor C5 are connected in parallel between the second output pin 7 and the first input pin 1; the third output pin 8 is emptied; the capacitor C6 is connected between the first input pin 1 and the third input pin 3 in parallel, and the capacitor C7 is connected between the third input pin 3 and the fourth input pin 4 in parallel; and one end of the second filter capacitor C2 is connected to the first output pin 5 and the other end thereof is grounded.

The main control circuit 12 receives the leakage current signal detected by the sampling circuit 11 via the first input pin 1 of the chip U1 and amplifies the leakage current signal. Once determining that the leakage current signal is greater than a predetermined value, the main control circuit 12 outputs a control signal to the on and off control circuit 13 via the first output pin 5 of the chip U1, to control the on and off control circuit 13 to be at an on state.

The feedback circuit includes the feedback resistor R4 and the feedback filter capacitor C5. The feedback circuit is also a gain circuit for regulating the sensitivity of an input signal by gain. The driving reverse voltage protection resistor R5 is configured for protecting the chip U1 from an impact of a reverse voltage. The second filter capacitor C2 is configured for filtering out undesired waves flowing towards a silicon controlled rectifier SCR in the on and off control circuit 13 to protect the silicon controlled rectifier SCR from the undesired waves.

The on and off control circuit 13 includes the silicon controlled rectifier SCR, a first voltage dependent resistor ZR1, and a coil RYX. An anode of the silicon controlled rectifier SCR is connected to the power supply circuit 14, a cathode thereof is grounded, and a gate thereof is connected to the driving reverse voltage protection resistor R5 of the main control circuit 12; the first voltage dependent resistor ZR1 is connected between the anode and the cathode of the silicon controlled rectifier SCR in parallel; and one end of the coil RYX is connected to the power supply circuit 14 and the other end thereof is grounded.

The on and off control circuit 13 is configured for controlling the on and off of the single-pole single-throw switches K12, K13, thereby further connecting the external power supply and the load or disconnecting the external power supply from the load.

The silicon controlled rectifier SCR is connected to the coil RYX and the sampling circuit 11. In the situation that the sampling circuit 11 does not detect any leakage current or the leakage current is less than the predetermined value, the chip U1 outputs the control signal to the silicon controlled rectifier SCR via the first output pin 5 to control the silicon controlled rectifier SCR to keep powering off the coil RYX. In this case, the leakage protector is at a state that the load and the power supply are connected. Once the chip U1 determines that the leakage current detected by the sampling circuit 11 reaches the predetermined value, the chip U1 controls the silicon controlled rectifier SCR to electrify the coil RYX. The coil RYX generates a magnetic force great enough after being electrified and causes the on and off control circuit 13 to control the single-pole single-throw switches K12, K13 to disconnect the external power supply from the load, thereby avoiding fires or electrical shocks.

The first voltage dependent resistor ZR1 is connected in parallel to the silicon controlled rectifier SCR for mainly preventing a reverse voltage from impacting the silicon controlled rectifier SCR, allowing the performance of the silicon controlled rectifier SCR to be more stable and more reliable.

The power supply circuit 14 is configured for providing a stable and reliable power supply to the leakage protector of the embodiment. The power supply circuit 14 includes a diode D5, a third filter capacitor C3, a voltage regulating resistor R2, and a bridge rectifier D1-D4. A cathode of the diode D5 is connected to the output terminal of the chip U1, and an anode of the diode D5 is connected to the anode of the silicon controlled rectifier SCR after being connected to the voltage regulating resistor R2 in series; a positive pole of a direct current output terminal of the bridge rectifier D1-D4 is connected to the anode of the silicon controlled rectifier SCR, and a negative pole of the direct current output terminal of the bridge rectifier D1-D4 is grounded, a positive pole of an alternating current input terminal of the bridge rectifier D1-D4 is connected to the live wire L through the coil RYX, and a negative pole of the alternating current input terminal of the bridge rectifier D1-D4 is connected to the neutral wire N through the coil RYX. The bridge rectifier D1-D4 converts a received alternating voltage to a direct voltage which is provided to the on and off control circuit 13.

The third filter capacitor C3 is configured for filtering out ripple voltages of the coil RYX, the voltage regulating resistor R2 is configured for regulating the voltage in the circuit and thus preventing a reverse voltage from impacting the chip U1; and the diode D5 is configured for preventing a surge voltage from affecting the coil RYX. The bridge rectifier D1-D4 is configured for converting an alternating voltage to a direct voltage required by the on and off control circuit 13.

The testing circuit 15 is configured for providing a simulated grounding failure current. The testing circuit 15 includes a testing resistor R1, a testing switch K11, and a second voltage dependent resistor R1. The testing resistor R1, the testing switch K11, and the second voltage resistor R1 are connected together in series and are connected to the first end of the current transformer ZCT.

When the testing switch K11 is pressed down, the testing circuit 15 is triggered to generate a grounding failure current to cause the on and off control circuit 13 to open the single-pole single-throw switches K12, K13, thereby disconnecting the external power supply from the load.

The testing resistor R1 is a current limiting resistor configured for providing the simulated grounding failure signal. The voltage dependent resistor ZR4 is connected to the testing resistor R1 in series for filtering out undesired waves and further avoiding failures or undesired movements of the testing circuit 15.

In the embodiment, the single-pole single-throw switches K12, K13 are arranged in the power supply side and are respectively located on the live wire L and the neutral wire N for controlling the connection between the power supply and the load. In other embodiments, the single-pole single-throw switches K12, K13 can also be arranged in the load side for controlling the connection between the power supply and the load.

In normal conditions, the single-pole single-throw switches K12, K13 are always closed; when the sampling circuit 11 detects the leakage current, the coil RYX is electrified to generate a magnetic force great enough to cause the single-pole single-throw switches K12, K13 to disconnect the external power supply from the load. Once the switches are opened, manual operation is required for re-closing the switches.

In the embodiment, the single-pole single-throw switches K12, K13 are arranged in the power supply side. One advantage of the arranging way of the switches K12, K13 is that, once the switches K12, K13 are opened, the sampling circuit 11, the main control circuit 12, the on and off control circuit 13, the power supply circuit 14, and the testing circuit 15 located after the switches K12, K13 are powered off immediately. Compared with the arranging way that the single-pole single-throw switches K12, K13 are arranged in the load side, the embodiment saves the energy and prevents the situation that the control circuit of the external power supply side is actually at work after the external power supply is disconnected from the load which may damage electrical components and cause a secondary leakage.

In normal conditions, the current flowing through the live wire L is equal to the current flowing through the neutral wire N. The leakage protector of the embodiment can detect a difference between the currents flowing through the live wire L and the neutral wire N. Once the difference is greater than the predetermined value, the external power supply is disconnected from the load to avoid risks of fires or electrical shocks.

Figure 2:
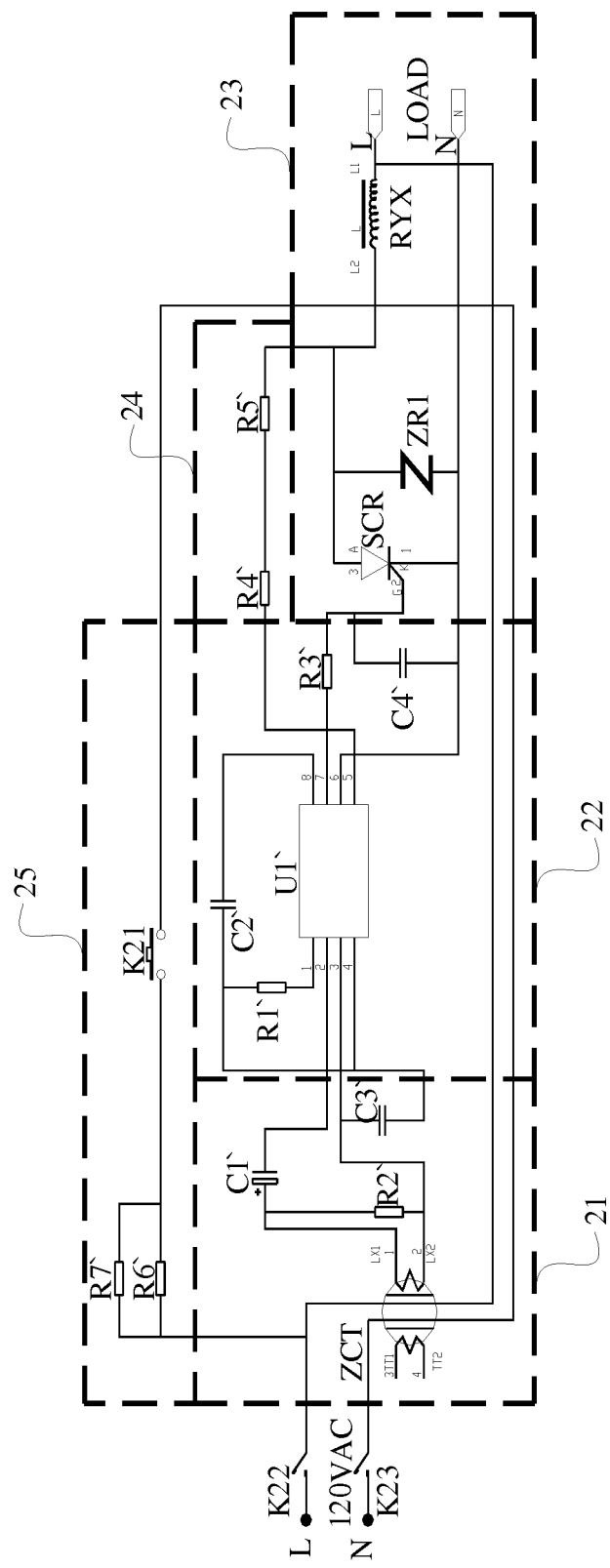
FIG. 2 is a schematic view of a safe quick disconnect leakage protector in accordance with a second embodiment of the present disclosure.

Referring to FIG. 2, which is a schematic view of a leakage protector in accordance with a second embodiment of the present disclosure, the leakage protector of the second embodiment is based on a chip FM2140. Similar to the leakage protector of the first embodiment, the leakage protector of the second embodiment includes a sampling circuit 21, a main control circuit 22, an on and off control circuit 23, a power supply circuit 24, a testing circuit 25, and a couple of single-pole single-throw switches K22, K23. Once a grounding failure condition is detected, the leakage protector immediately cuts off currents flowing through the live wire L and the neutral wire N and thus disconnects the external power supply from a load, avoiding risks of fires or electrical shocks.

The sampling circuit 21 includes a sampling capacitor C1', a filter capacitor C3', a current transformer ZCT made of ultra-crystalline or permalloy which is the same as of the current transformer ZCT of the sampling circuit 11 of the first embodiment, and a current-voltage conversion resistor R2' connected to two wire ends LX1, LX2 of a second end of the current transformer ZCT. The sampling capacitor C1' is configured for being coupled with an alternating current signal generated by the current transformer ZCT before the alternating current signal reaches a chip U1' of the main control circuit 22; and the filter capacitor C3' is configured for filtering out undesired waves before the alternating current signal reaches the chip U1'. The difference between the sampling circuit 21 of the second embodiment and the sampling circuit 11 of the first embodiment lies in that the sampling circuit 21 is configured with the omission of the current limiting resistor. This is because the chip U1' of the main control circuit 22 is different from the chip U1 of the main control circuit 12 of the first embodiment.

The main control circuit 22 includes the chip U1' having a model being FM2140, a feedback resistor R1' having a resistance ranging from 100K to 470K, a driving reverse voltage protection resistor R3' having a resistance being 1K, a timing capacitor C2', and a filter capacitor C4'. The feedback resistor R1' and the timing capacitor C2' form a feedback circuit of the main control circuit 22.

Compared with the first embodiment, the chip U1' of the embodiment includes six input pins 1, 2, 3, 4, 5, and 6 and two output pins 7, 8. The feedback resistor R1' of the feedback circuit and the timing capacitor C2' are connected in series between the first input pin 1 and the second output pin 8 of the chip U1'; the second input pin 2 is connected to the sampling capacitor C1' of the sampling circuit 21; the third input pin 3 is connected to the second wire end LX2 of the second end of the current transformer ZCT of the sampling circuit 21; the fourth input pin 4 is connected to the filter capacitor C3' of the sampling circuit 21; the five input pin 5 is connected to the power supply circuit 24, the sixth input pin 6 is connected to the neutral wire, and the first output pin 7 is connected to the on and off control circuit 23 through the driving reverse voltage protection resistor R3'.

The feedback resistor R1' is configured for eliminating a minimum threshold value of the grounding failure condition. If the smallest threshold value is not eliminated, the chip U1' may output a grounding failure signal to the on and off control circuit 23 through the first output pin 7 by mistake; the driving reverse voltage protection resistor R3' is configured for preventing a reverse voltage from impacting the chip U1', just like the resistor R5 of the main control circuit 12 of the first embodiment; and the timing capacitor C2' is configured for cooperating with the feedback resistor R1 for detecting the minimum grounding failure condition.

The filter capacitor C4' is configured for filtering out undesired waves of a silicon controlled rectifier SCR flowing towards the on and off control circuit 23, thereby protecting the silicon controlled rectifier SCR from the undesired waves.

The on and off control circuit 23 of the second embodiment includes the silicon controlled rectifier SCR being the same as the silicon controlled rectifier SCR of the on and off control circuit 13, a voltage dependent resistor ZR1, and a coil RYX. Functions of the components of the on and off control circuit 23 are the same as those of the on and off control circuit 13 of the first embodiment, which are not given in detail herein.

The power supply circuit 24 includes two voltage dropping resistors R4', R5' which have the same resistance and are connected together in series for providing a suitable alternating voltage to the chip U1'. One end of the serially-connected voltage dropping resistors R4', R5' is connected to an output terminal of the chip U1' and the other end thereof is connected to an anode of the silicon controlled rectifier SCR and the coil RYX.

Compared with the power supply circuit 14 of the first embodiment, the power supply circuit 24 of the second embodiment is greatly simplified due to the fact that the two chips adapted in the two embodiments are different from each other.

The testing circuit 25 includes two resistors R6, R7 which have the same resistance and are connected together in parallel and a testing switch K21. The resistors R6 and R7 form a testing resistor, and the testing switch K21 and the testing resistor are connected in series between the live wire and the neutral wire.

Functions of the testing resistor and the testing switch K21 of the second embodiment are respectively the same as the functions of the testing resistor R1 and the testing switch K1 of the testing circuit 15 of the first embodiment. The difference between the testing circuit 25 and the testing circuit 15 lies in that the testing circuit 25 is configured with the omission of the voltage dependent resistor ZR1. It is noted that the number of the resistors having the same resistance forming the testing resistor can be more than two according to actual requirements.

Similar to the first embodiment, the couple of single-pole single-throw switches K22, K23 are arranged in the power supply side. When the grounding failure current detected by the sampling circuit is greater than a predetermined value, the on and off control circuit controls the single-pole single-throw switches K22, K23 to disconnect the external power supply from the load, thereby avoiding risks of fires and electrical shocks.

Through the above comparison, it can be concluded that function modules of the two leakage protectors of the two embodiments are identical to each other, and each leakage protector includes the sampling circuit, the main control circuit, the on and off control circuit, the power supply circuit, the testing circuit, and the couple of single-pole single-throw switches. Due to the fact that the chips adapted in the two embodiments are different from each other, the structure of the leakage protector of the second embodiment is much simpler.

As discussed above, the leakage protector of the present disclosure is powered by the power supply circuit; the sampling circuit collects the leakage current signal between the live wire and the neutral wire and outputting the leakage current signal; the main control circuit receives the leakage current signal outputted from the sampling circuit, amplifies the leakage current signal, and outputs a grounding failure control signal when the leakage current reaches the predetermined value; the on and off control circuit receives the grounding failure control signal outputted from the main control circuit and controls the single-pole single-throw switches to disconnect the load from the external power supply according to the grounding failure control signal, thereby protecting the load and improves the safety of the leakage protection of an electrical appliance; meanwhile, the testing circuit is configured for providing a stimulated failure current signal to test whether the leakage protector works normally, which improves the working effectiveness of the leakage protector; in addition, the single-pole single-throw switches are arranged in the power supply side to ensure that the leakage protector is not electrified after the load is disconnected from the external power supply, which prevents the situation that the circuit of external the power supply side is still at work after the load is actually disconnected from the load and avoids the damages of the electrical components and a secondary leakage caused thereby; the current-voltage conversion resistor adapted in the sampling circuit converts the current to the voltage, which enables the sampling signal to be more stable and reliable; the driving reverse voltage protection resistor arranged in the output side of the chip is capable of preventing the reverse voltage from impacting the chip and the silicon controlled rectifier SCR to reduce the fault rates of the chip and the silicon controlled rectifier SCR and to improve the stability of the whole product; both the sampling circuit and the testing circuit are provided with filter capacitors for filtering out undesired waves, which protects the product from undesired waves and thus improves the anti-interference ability of the product and the performance of the product.

Meanwhile, the single-pole single-throw switches are arranged on the live wire and the neutral wire of the power supply side and are normally closed. Once the grounding failure situation is found, the current flowing between the power supply and the load are cut off to avoid risks of fires or electrical shocks. In addition, since the switches are arranged in the power supply side, after the switches are opened, the whole controlling system is powered off to avoid the situation that the circuit of the power supply side is still at work after the external power supply is disconnected from the load and further avoid the damages of the electrical components and the secondary leakage caused thereby. Furthermore, the function of the product is clear, the structure of the product is compact, and the maintenance of the product is easy and convenient.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A safe quick disconnect leakage protector, comprising:
a power supply circuit, configured for providing power to the leakage protector;
a sampling circuit connected between a live wire and a neutral wire of an input terminal of an external power supply, for collecting a leakage current signal between the live wire and the neutral wire and outputting the leakage current signal;
a main control circuit, configured for receiving the leakage current signal outputted from the sampling circuit, amplifying the leakage current signal, and outputting a grounding failure control signal when the leakage current reaches a predetermined value;
a couple of single-pole single-throw switches, one of the single-pole single-throw switch being connected between the input terminal of the external power supply and the sampling circuit on the live wire, and the other one being connected between the input terminal of the external power supply and the sampling circuit on the neutral wire;
an on and off control circuit, configured for receiving the grounding failure control signal outputted from the main control circuit and controlling the single-pole single-throw switches to disconnect the load from the external power supply according to the grounding failure control signal; and
a testing circuit connected to the sampling circuit for providing a stimulated failure current signal to the sampling circuit to test whether the leakage protector work normally
wherein the sampling circuit comprises a current transformer, a sampling capacitor, a first filter capacitor, and a current-voltage conversion resistor; the live wire and the neutral wire respectively pass through the current transformer or are respectively wrapped around the current transformer; a first end of the current transformer is connected to the testing circuit and a second end of the current transformer is connected to the main control circuit through the sampling capacitor; one end of the first filter capacitor is connected to a wire end of the second end of the current transformer and the other end of the first filter capacitor is grounded; and the current-voltage conversion resistor is connected between two wire ends of the second end of the current transformer in parallel.

2. The leakage protector of claim 1, wherein the sampling circuit further comprises a current limiting resistor connected between the first filter capacitor and the main control circuit in series.

3. The leakage protector of claim 1, wherein the main control circuit comprises a chip, a feedback circuit, a second filter capacitor, and a driving reverse voltage protection resistor; an input terminal of the chip is connected to the sampling circuit and the power supply circuit; an output terminal of the chip is connected to the on and off control circuit; the feedback circuit is connected between the input terminal and output terminal of the chip; one end of the second filter capacitor is connected to the output terminal of the chip and the other end of the second filter capacitor is grounded; and the driving reverse voltage protection resistor is connected between the output terminal of the chip and the on and off control circuit in series.

4. The leakage protector of claim 3, wherein the on and off control circuit comprises a silicon controlled rectifier, a first voltage dependent resistor, and a coil; an anode of the silicon controlled rectifier is connected to the power supply circuit, a cathode of the silicon controlled rectifier is grounded, and a gate of the silicon controlled rectifier is connected to the driving reverse voltage protection resistor of the main control circuit; the first voltage dependent resistor is connected the anode and the cathode of the silicon controlled rectifier in parallel; and one end of the coil is connected to the power supply circuit and the other end of the coil is connected to the live wire.

5. The leakage protector of claim 4, wherein the main control circuit comprises a sampling filter capacitor connected between the input terminal of the chip and the sampling circuit.

6. The leakage protector of claim 5, wherein the power supply circuit comprises a diode, a third filter capacitor, a voltage regulating resistor, and a bridge rectifier; a cathode of the diode is connected to the output terminal of the chip and an anode of the diode is connected to the anode of the silicon controlled rectifier after being connected to the voltage regulating resistor in series; a positive pole of a direct current output terminal of the bridge rectifier is connected to the anode of the silicon controlled rectifier, a negative pole of the direct current output terminal of the bridge rectifier is grounded, and an alternating current input terminal of the bridge rectifier is connected to the external power supply; and the bridge rectifier converts a received alternating current to a direct current which is provided to the on and off control circuit.

7. The leakage protector of claim 4, wherein the power supply circuit comprises two voltage dropping resistors connected together in series; one end of the two serially-connected resistors is connected to the output terminal of the chip and the other end thereof is connected to the anode of the silicon controlled rectifier and the coil.

8. The leakage protector of claim 7, wherein the testing circuit comprises a testing resistor and a testing switch; the testing resistor and the testing switch are connected together in series between the neutral wire and the live wire; and the testing resistor is formed by several resistors which have the same resistance and are connected together in parallel.

9. The leakage protector of claim 6, wherein the testing circuit comprises a testing resistor, a testing switch, and a second voltage dependent resistor; the testing resistor, the testing switch, and the second voltage dependent resistor are connected together in series, and the serially-connected testing resistor, testing switch, and second voltage dependent resistor is further connected to a first end of the current transformer.

10. The leakage protector of claim 2, wherein the main control circuit comprises a chip, a feedback circuit, a second filter capacitor, and a driving reverse voltage protection resistor; an input terminal of the chip is connected to the sampling circuit and the power supply circuit; an output terminal of the chip is connected to the on and off control circuit; the feedback circuit is connected between the input terminal and output terminal of the chip; one end of the second filter capacitor is connected to the output terminal of the chip and the other end of the second filter capacitor is grounded; and the driving reverse voltage protection resistor is connected between the output terminal of the chip and the on and off control circuit in series.

* * * * *